(12) United States Patent
Poole

(10) Patent No.: US 9,673,979 B1
(45) Date of Patent: Jun. 6, 2017

(54) HIERARCHICAL, DETERMINISTIC, ONE-TIME LOGIN TOKENS

(71) Applicant: EMC IP Holding Company LLC, Hopkinton, MA (US)

(72) Inventor: James Poole, Atlanta, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/751,857

(22) Filed: Jun. 26, 2015

(51) Int. Cl.
*H04K 1/00* (2006.01)
*H04L 9/16* (2006.01)
*H04L 9/30* (2006.01)

(52) U.S. Cl.
CPC .............. *H04L 9/16* (2013.01); *H04L 9/30* (2013.01); *H04L 2209/24* (2013.01)

(58) Field of Classification Search
CPC ..................................... H04L 9/16; H04L 9/30
USPC ............................................................ 380/44
See application file for complete search history.

(56) References Cited

U.S. PATENT DOCUMENTS

| | | | |
|---|---|---|---|
| 7,490,347 B1 | 2/2009 | Schneider et al. | |
| 7,788,484 B2 | 8/2010 | Paya et al. | |
| 8,769,657 B2 | 7/2014 | Zaitsev | |
| 8,862,865 B2 | 10/2014 | Gavrilov | |
| 2003/0005308 A1 | 1/2003 | Rathbun et al. | |
| 2004/0225893 A1 | 11/2004 | Ng | |
| 2008/0133914 A1 | 6/2008 | Isaacson et al. | |
| 2010/0122091 A1 | 5/2010 | Huang et al. | |
| 2013/0174238 A1* | 7/2013 | Wang | H04N 21/25816 726/7 |
| 2016/0094551 A1* | 3/2016 | Sugihara | G06F 21/30 726/7 |

OTHER PUBLICATIONS

GitHub, bips/bit-0032.mediawiki at master—bitcoin/bips., 2015 GitHub, Inc. pp. 1-10. https://github.com/bitcoin/bips/blob/master/bip-0032.mediawiki.

Nystrom, Identifiers and Test Vectors for HMAC-SHA-224, HMAC-SHA-256, HMAC-SHA-384, and HMAC-SHA-512, RSA Security, Dec. 2005, pp. 1-9. http://tools.ietf.org/html/rfc4231.

* cited by examiner

*Primary Examiner* — Mohammad W Reza
(74) *Attorney, Agent, or Firm* — Ryan, Mason & Lewis, LLP

(57) ABSTRACT

Methods, systems and articles of manufacture for hierarchical, deterministic, one-time login tokens are provided herein. A method includes generating a plurality of items of key information comprising a first item of key information and a second item of key information that is derived from the first item of key information; attributing a distinct authorization level to the plurality of items of key information to create a modified version of the first item of key information and a modified version of the second item of key information; providing the modified version of the first item of key information to a first cryptographic device to be used in an authentication request associated with a second cryptographic device; and providing the modified version of the second item of key information to the second cryptographic device to be used in an authentication request with the first cryptographic device.

20 Claims, 5 Drawing Sheets

HIERARCHICAL, DETERMINISTIC, ONE-TIME LOGIN TOKENS

FIELD

The field relates generally to cryptography, and more particularly to user authentication techniques.

BACKGROUND

In order to gain access to applications, systems, and/or other resources via a computer or another user device, users are often required to authenticate themselves by entering authentication information. Such authentication information may include, for example, passwords, secrets, and/or security tokens. Such authentication information may include, for example, one-time passwords or login tokens.

Challenges facing existing token-based user authentication techniques, however, can include attacks by an adversary that compromises and/or impersonates a user by stealing the user's credentials. In other attacks, an adversary can control the operation of an authentication server over an extended period of time, wherein such an adversary can subvert the authentication process, impersonating a user even if the user's credentials are periodically refreshed.

SUMMARY

One or more illustrative embodiments of the present invention provide hierarchical, deterministic, one-time login tokens and techniques for use thereof.

In accordance with one embodiment of the invention, a first method is provided comprising the steps of: generating a plurality of items of key information comprising (i) a first item of key information and (ii) a second item of key information that is derived from the first item of key information; attributing a distinct authorization level, from a set of multiple authorization levels, to the plurality of items of key information to create (i) a modified version of the first item of key information and (ii) a modified version of the second item of key information; providing the modified version of the first item of key information to a first cryptographic device to be used in connection with processing an authentication request associated with a second cryptographic device; and providing the modified version of the second item of key information to the second cryptographic device to be used in connection with a submission of an authentication request to the first cryptographic device.

In accordance with another embodiment of the invention, a second method is provided comprising the steps of: processing an indication, generated by a user, to access a protected resource on a cryptographic device; generating, in response to said processing, a request to authenticate the user to the cryptographic device to access the protected resource, wherein said generating comprises encrypting a message using an item of key information, wherein the item of key information includes a designation of a distinct authorization level attributed to the user from a set of multiple authorization levels, and wherein the message comprises: an incremental item of cryptographic information to be used exclusively in connection with the request to authenticate the user to the cryptographic device to access the protected resource; and initiating a transmission of the request to the cryptographic device.

In accordance with yet another embodiment of the invention, a third method is provided comprising the steps of: processing a request to authenticate a user to access a protected resource, wherein the request comprises an encrypted message including an item of cryptographic information, and wherein said processing comprises: decrypting the encrypted message using an item of key information, wherein the item of key information includes a designation of a distinct authorization level, selected from a set of multiple authorization levels; and comparing the item of cryptographic information to one or more items of cryptographic information observed in connection with one or more previous authentication requests to determine a status of the item of cryptographic information in relation to the one or more items of cryptographic information observed in connection with the one or more previous authentication requests; and resolving the authentication request based on (i) said decrypting and (ii) said comparing.

In accordance with another embodiment of the invention, a cryptographic device is provided that includes a processor coupled to a memory and configured to implement noted method steps detailed herein.

The methods and cryptographic devices of the illustrative embodiments overcome one or more of the problems associated with the conventional techniques described previously, and provide the ability for multiple third party systems to authenticate between themselves without requiring integration among the third party systems. These and other features and advantages of the present invention will become more readily apparent from the accompanying drawings and the following detailed description.

DETAILED DESCRIPTION

As will be described, one or more embodiments of the invention includes the generation and utilization of hierarchical, deterministic, one-time login tokens to enable users of a first system to have efficient access to particular data on a second system. Such generation and utilization of one-time login tokens, according to one or more embodiments of the invention, requires no extra or additional configuration to associated web servers, and further requires no extra or additional accounts to be created for the user on either the first system or the second system. Additionally, at least one embodiment of the invention includes incorporating an ability to set and/or specify authorization levels.

Illustrative embodiments of the present invention will be described herein with reference to exemplary cryptographic devices. It is to be appreciated, however, that one or more embodiments of the invention are not restricted to use with the particular illustrative system and device configurations shown.

Accordingly, the term "cryptographic device," as used herein, is intended to be construed broadly so as to encompass any type of processing device that incorporates cryptographic functionality (such as a computer, server, mobile telephone, radio-frequency identification (RFID) tag or reader, authentication token, etc.). Similarly, the term "authentication server" should be understood to encompass any type of processing device or set of such devices that is operative to authenticate information provided by an authentication token generator or other type of device. As used herein, an "authentication server" need not be a network-based server, and may be implemented as a portion of a device that performs other functions, as a combination of multiple servers or other devices, or in other forms.

Additionally, the term "authentication information," as used herein, is intended to include passwords, passcodes, security tokens, answers to life questions, or other authentication credentials, or values derived from such authentication credentials, or more generally any other information that a user may be required to submit in order to obtain access to an access-controlled application or resource.

Also, the term "cryptographic information," as used herein, is intended to include any number, value, key, or other information utilized in furtherance of a cryptographic function or process.

Figure 1:
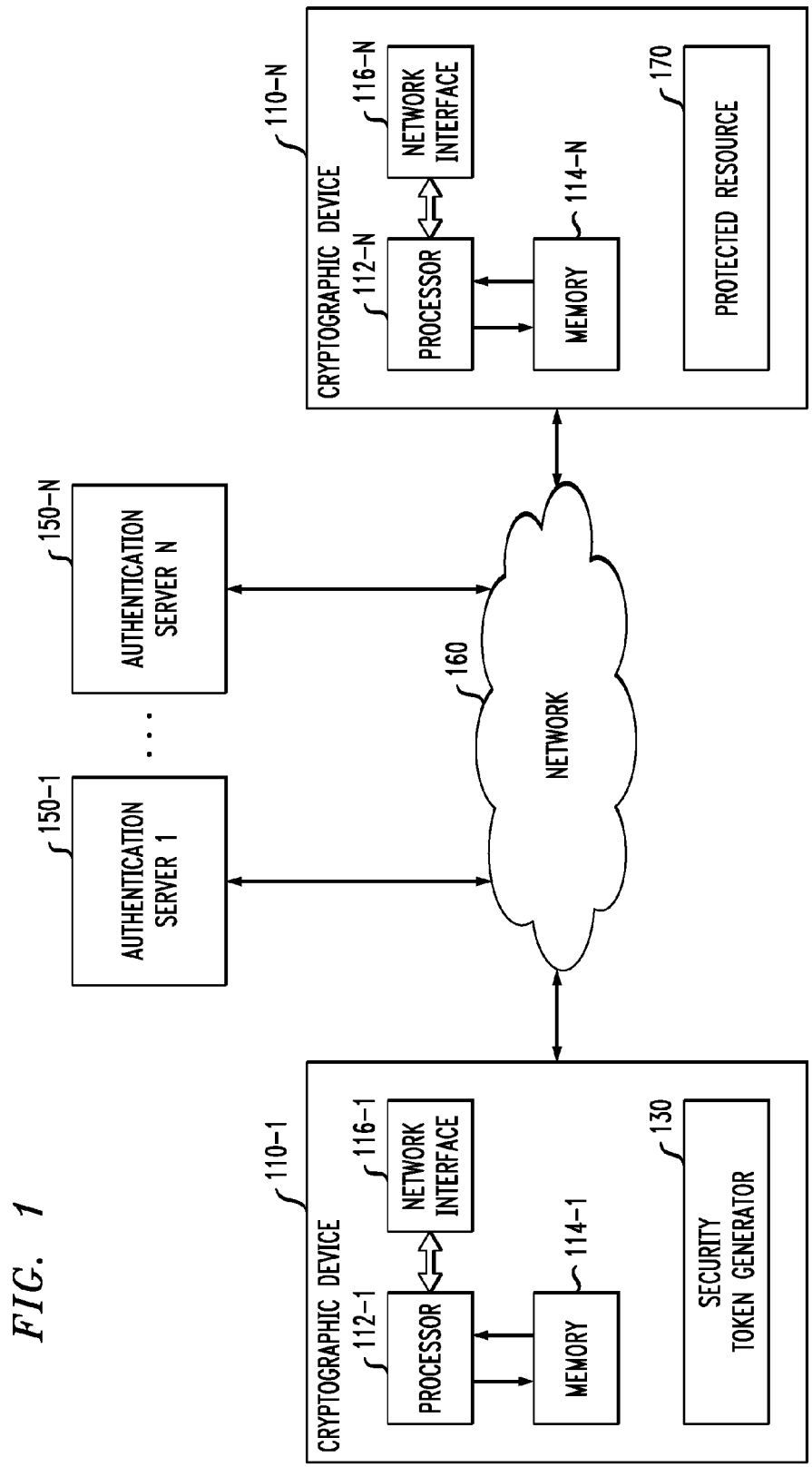
FIG. 1 is a diagram illustrating an example network environment in which one or more embodiments of the present invention can operate.

FIG. 1 illustrates an example cryptographic device 110-1 communicating with another example cryptographic device 110-N in an attempt to access a protected resource 170 (on cryptographic device 110-N) over a network 160. In an example implementation, a user must authenticate with one or a plurality of authentication servers 150-1 through 150-N (hereinafter, collectively referred to as authentication servers 150) using authentication information (such as a security token) generated by a security token generator 130 (hereinafter, referred to as security token 130) before obtaining access to the protected resource 170. Additionally, while shown in the FIG. 1 example as being resident on cryptographic device 110-N, in one or more embodiments of the invention, the protected resource 170 can include, for example, a separate cryptographic device, a component of a system, particular data on a system associated with cryptographic device 110-1, and/or particular data on a system not associated with cryptographic device 110-1 (such as cryptographic device 110-N, as shown in the example FIG. 1).

Referring back to FIG. 1, the network 160 can include, for example, a global computer network such as the Internet, a wide area network (WAN), a local area network (LAN), a satellite network, a telephone or cable network, or various portions or combinations of these and other types of networks.

According to one example embodiment of the invention, the user of the cryptographic device 110-1 is authenticated, using authentication information such as a one-time login token generated by the security token generator 130, by authentication servers 150. The exemplary communications among the system elements 110-1, 130, 150 and 110-N of FIG. 1 to achieve joint authentication by the authentication servers 150 is discussed further below.

It is to be appreciated that a given embodiment of the disclosed system may include multiple instances of cryptographic device 110-1 and/or 110-N, security token 130 and protected resource 170, and possibly other system components, although the noted instances of such components are shown in the simplified system diagram of FIG. 1 for clarity of illustration.

The security token 130 is shown in FIG. 1 as being resident on cryptographic device 110-1. However, in one or more embodiments of the invention the security token 130 may be separate from and electrically connected to the cryptographic device 110-1. The security token 130 may be implemented, for example, using the RSA SecurID® user authentication token commercially available from RSA Security Inc. of Bedford, Mass., U.S.A. The security token 130 may be a server or other type of module that is accessible over the network 160, or it may be a software component resident on the cryptographic device 110-1. As another alternative, security token 130 may be distributed over multiple devices, one of which may be the cryptographic device 110-1. By way of yet another alternative, security token 130 may be resident on and/or connected to the authentication server 150. In such an embodiment of the invention, the security token 130 can be on an authentication server 150 and, as part of a client request to the authentication server 150 (server N, in this example), the security token 130 can respond back with a command such as, for example, "Get resource X from server N+1 using Token Y."

Accordingly, it should be appreciated that one or more additional implementations are within the scope of embodiments of the invention, as would be apparent to a person of ordinary skill in the art.

Cryptographic devices 110-1 and 110-N, as depicted in FIG. 1 (and also additionally described in connection with the example device illustrated in FIG. 8), include a processor 112-1 and 112-N, respectively, coupled to a memory 114-1 and 114-N, respectively, as well as a network interface 116-1 and 116-N, respectively. As further detailed herein, each such processor (112) is coupled to a memory (114) and configured to implement noted actions internally and/or over network 160 (via a network interface (116)) in connection with other devices such as, for example, authentication servers 150 and one or more other cryptographic devices. Cryptographic devices 110-1 and 110-N may, respectively, represent a portable device, such as a mobile telephone, personal digital assistant (PDA), wireless email device, game console, etc. Cryptographic devices 110-1 and 110-N may, respectively, alternatively represent a desktop or laptop personal computer (PC), a microcomputer, a workstation, a mainframe computer, a wired telephone, a television set top box, or any other cryptographic device which can benefit from the use of authentication techniques in accordance with one or more embodiments of the invention.

Cryptographic devices 110-1 and 110-N may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, login token, or other authentication information described as being associated with a user may, for example, be associated with a cryptographic device (such as 110-1 and/or 110-N), a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the authentication information that is presented by a cryptographic device (such as 110-1, for example). Alternatively, in one or more embodiments of the invention, the authentication server 150 can be resident on and/or part of one of the parties and/or entities seeking authentication. For example, in such an implementation, the authentication server 150 could be embedded inside a component such as, for instance, a web browser.

Further, the protected resource 170 may be, for example, an access-controlled application, a remote application server such as a web site or other software program or hardware device that is accessed by the cryptographic device 110 over a network 160. Additionally, as noted above, the protected resource 170 can also be, for example, a separate cryptographic device, a component of a system or separate cryptographic device (such as illustrated in the FIG. 1 example), particular data on a system associated with cryptographic device 110-1, and/or particular data on a system not associated with cryptographic device 110-1 (such as cryptographic device 110-N, as depicted in the FIG. 1 example). In other words, a protected resource 170 is a resource that grants user access responsive to an authentication process, as will be described in greater detail below.

Accordingly, as discussed above, in order to authenticate a user (such as depicted by cryptographic device 110-1, for example) to a system (such as depicted by cryptographic device 110-N containing protected resource 170, for example), a security token or secret (such as a password or a certificate) can be used. Generally, if the user connecting to a system knows this secret, then the user is granted access to the system.

As such, at least one embodiment of the invention includes the aspect of generating (via security token generator 130, for example) and sharing a secret between two systems, so that if System A redirects a user (cryptographic device 110-1, for example) to System B (cryptographic device 110-N, for example), System A would include the secret in the request (to redirect the user to System B). When such a request is received by System B, System B would verify the presence of the secret in the request, and if valid, authorize the user. In such an embodiment of the invention, the authentication servers 150 would be resident on System B, and/or offloaded by System B to a third party system to carry out the authentication process.

Such an authentication mechanism, however, may allow the possibility for a third party to eavesdrop on the communication (including the redirected user) and subsequently re-use the secret to gain unwanted access to System B. Consequently, at least one embodiment of the invention can also include incorporating an aspect of public/private cryptography to hide the secret while proving ownership of the secret. In such an embodiment, System B is given a private key (Priv1) and System A is given a public key (Pub1) based on Priv1. In at least one embodiment of the invention, the system and/or user that controls the authentication process generates the keys. In one or more other embodiments of the invention, a third party system can generate the keys. In such an embodiment, the third party system can generate a master key, and then generate sub-keys off the master key for any systems desired to be protected (such as, for example, System B). By using such an implementation, the user and/or system would only need to maintain a copy of the master key as a backup, and generate any sub-keys as necessary on demand.

Further, System A can use Pub1 to generate a token (as part of an authentication request submitted to System B) that proves that System A has the public key. For example, System A can encrypt a message with Pub1 so that only System B can decrypt the message because System B holds Priv1 (and Priv1 is required to decrypt the message), thereby proving to System B that System A holds Pub1.

Additionally, in such an embodiment of the invention, when forwarding or redirected a user to System B, System A can include this proof that it (System A) has the public key in its possession that corresponds to the System B private key. When System B receives an authentication request, System B will attempt to use its private key to unencrypt the corresponding message (encrypted with System A's public key), and if System B is successful in doing so, System B will authenticate the user.

While this approach does prevent an eavesdropper from obtaining access to the secret, such an authentication mechanism may, however, allow the possibility for a third party to eavesdrop on the communication and subsequently use the same encrypted value on a future request to access the same information at a later time. If an eavesdropper (or a malicious user) is able to observe or obtain one such authentication request, that eavesdropper could potentially re-use this same authentication request at a later time to gain access to the system.

Consequently, at least one embodiment of the invention can also include incorporating an incrementing nonce to prevent replay attacks. As used herein, a nonce refers to a number or other form of cryptographic information that can be embedded in a cryptographic communication, such as embedded in an encrypted message (or be the only thing encrypted), that increments with each subsequent cryptographic communication (for example, increments by one each time an authentication request is made).

By way of illustration, consider the following implementation of such an embodiment of the invention. System A starts with the nonce at a value of 0, and each time that System A makes an authentication request, System A increases the nonce by 1, encrypts the nonce in a message using a public key (that is based on a private key of System B), and includes the nonce in the authentication request to the server (or to System B).

System B keeps track of the highest nonce value that it (System B) has received in an authentication request to that point. Every time System B receives a new authentication message or request, System B unencrypts/decrypts the nonce using its private key and compares the value of the nonce against the previously highest nonce value. If the decrypted nonce value is greater than the previously highest received nonce value, then System B authenticates the user and saves the new nonce value as the highest value. If the unencrypted nonce value is equal to or lower than a previously received nonce value, then System B can assume that a replay attack is under way and deny the authentication request.

By way of further example, in one or more embodiments of the invention, the current time (in milliseconds, for instance) can be used as the nonce value.

Additionally, at least one embodiment of the invention includes incorporating an ability to communicate multiple/different authorization levels in conjunction with using pre-defined public and private keys. By way of example, in certain contexts, enterprise settings, and/or product configurations, different users may be associated with different roles, and those different roles may be associated with different levels of authorization. Consider, for example, a vulnerability risk management system that designates the following user roles: administrator (Admin), operations (Ops), and read-only.

Figure 2:
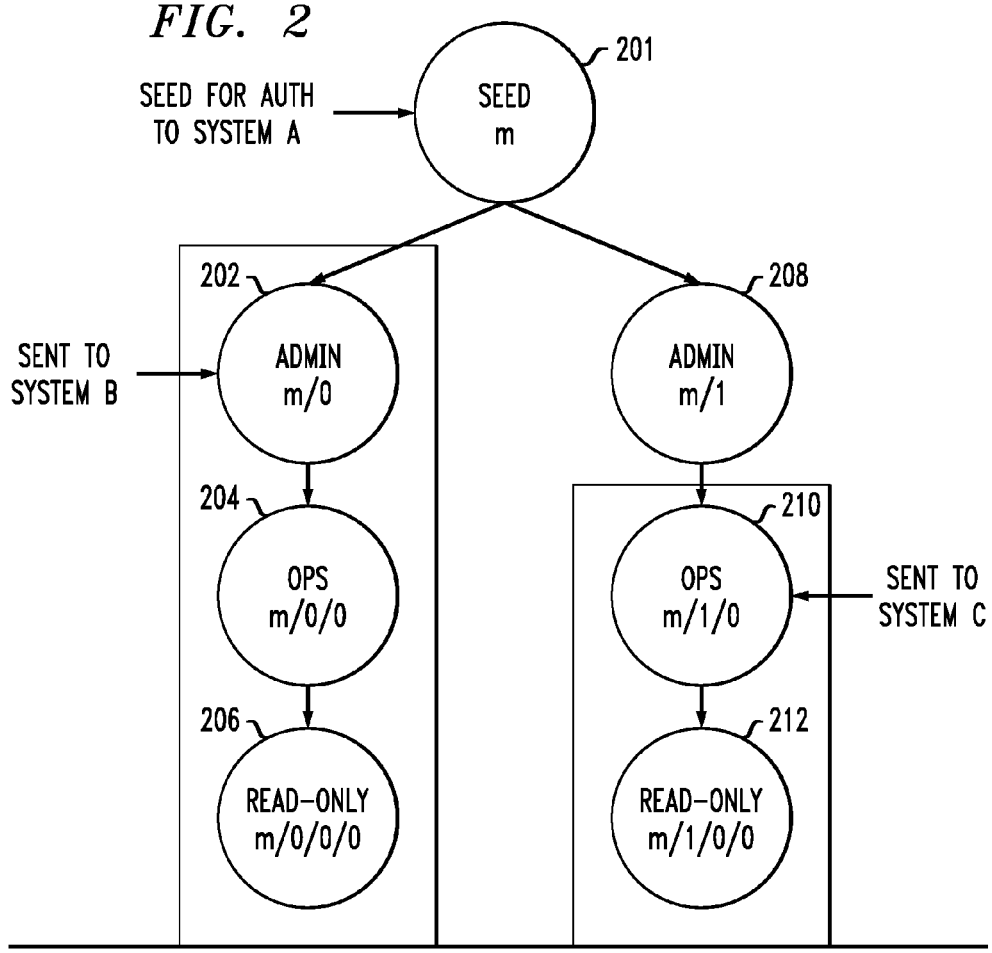
FIG. 2 is a diagram illustrating an example embodiment of the invention.

FIG. 2 is a diagram illustrating an example embodiment of the invention. In the FIG. 2 example, the role of Admin is the highest level; that is, the role of Admin is associated with more permissions/authorizations than the role of Ops, which is, in turn, associated with more permissions/authorizations than the role of read-only. These roles form a hierarchy wherein different permissions (that is, authorizations) are granted for each role. Further, the roles above a given role (in the hierarchy) contain all of permissions below the given role plus one or more additional permissions.

Also, in FIG. 2 (and elsewhere herein), "m" refers to the master node (or "seed"). From the master node, N private/public key pairs can be generated. "m/0" and "m/1" refer to a generated sub-key of index 0 and index 1, respectively, off the seed 201. From any private/public key, additional sub-keys can be derived. Accordingly, in FIG. 2, "m/0/0" and "m/1/0" refer to the key at index 0 derived from the key "m/0," and the key at index 0 derived from the key "m/1," respectively. Additionally, a private key can generate private/public sub-keys, whereas a public key can only generate public sub-keys (that would match the public key generated from a private key with the same derivation path).

Referring specifically to the example depicted in FIG. 2, a single seed (m) 201 can be used to generate multiple child keys to authenticate N number of third party systems (FIG. 2 illustrates two such systems: System B and System C). Additionally, System A can send any sub-level of authorization to any third party system. In the example depicted in FIG. 2, System A allows permissions associated with Admin (m/0) 202, Ops (m/0/0) 204, and Ready-Only (m/0/0/0) 206 to System B, but System A allows only permissions associated with Ops (m/1/0) 210 and Read-Only (m/1/0/0) 212 to System C. As illustrated in this example, System A does not allow permissions associated with Admin (m/1) 208 to System C.

Further, in one or more embodiments of the invention, System A can revoke permissions from System B and/or System C, for example, by internally marking any child keys from m/0 (202) or m/1 (208) as no longer valid.

Also, in one or more embodiments of the invention, additional systems or sub-systems can be authenticated in a hierarchical fashion if allowed by System A. By way of example, System A can allow System B to share derived keys (for instance, another Read-Only-level key (m/0/0/1)) with one or more other systems (for example, System D) without System A having to specifically share keys with System D, because, in such an embodiment, System B can derive public child keys from any existing public key (for instance, System B can derive m/0/0/1 from m/0/0). Such an embodiment can include enabling specific management by System A to determine which branches of the tree are to be allowed (if any).

Accordingly, to allow different roles to be mapped to different public/private key pairs, at least one embodiment of the invention includes deriving a key tree from a single seed value. In such an embodiment, a random seed is first generated, then a public and private extended key pair is generated based thereon. To generate the master key or seed "m" from a randomly generated value (for example, a random 256 buffer), the random value can be run through a hash algorithm, such as HMAC_SHA512, for example, with a pre-determined value for the SHA512 key. This would provide a random but reproducible 512 bit buffer (64 bytes).

From this, the buffer can be partitioned in half into two 32 byte buffers using the first 32 bytes as a secret key and the second 32 bytes as a chain code. The combination of the secret key and the chain code is what is referred to as an extended key. From the secret key and the chain code, child keys can be derived.

As such, from the master key, chain code, and index, child private and public keys can be derived in a reproducible fashion. From there, any private key can derive child public and/or private keys based on its own secret, chain code, and index, and any public key can only derive corresponding public keys based on its own secret, chain code, and index. Also, any private/public key pair that can derive a child key using the same index value would be a valid public/private key pair.

Additionally, from a pair of public and private extended keys, another level (for example, a second level) of $2^{31}$ keys can be created. In such an example implementation, 32 bits of data is used as the size for the value on which the index is based. One of the bits in the index value is reserved for a special purpose identity when calculating child keys. That said, it should be appreciated by one skilled in the art that one or more embodiments of the invention need not be limited to $2^{31}$ keys, and other configurations and/or implementations can be utilized. From each of the second level keys, another level (for example, a third level) of $2^{31}$ keys can be derived, and so on.

By way of illustration, the example algorithm detailed below depends on the index number (i) of the key for derivation (for example, i=0 when deriving "m/0") and also on whether the parent key is a public or private key. Continuing with the above example, if the index number (i) number is $\geq 2^{31}$, then that index number (i) is denoted as a hardened key; otherwise, that index number (i) is denoted as a normal key.

In this example embodiment, deriving a private child key from a private parent key includes determining whether the key is a hardened key (that is, whether i$\geq 2^{31}$.) If the key is a hardened key, then I=HMAC_SHA512 (the key=a parent chain code; data=0x00||ser256(parent secret key)||ser32(i)), wherein "serX" represents a serialize integer as X bits, with the most significant byte first. If the key is a normal key, then I=HMAC_SHA512 (the key=a parent chain code; data=serp (point(parent secret key)||ser32(i)), wherein "serp" represents a serialize key pair using SEC1's compressed form, and wherein point(p) represents a coordinate key pair from elliptical curve (EC) point multiplication of the secp256k1 base point with integer p. As also utilized above and further herein, || represents a concatenation operation. Additionally, the first 32 bytes of I are $I_l$ and the second 32 bytes are $I_r$. The child secret key is parse256($I_l$)+(parent secret key mod n), and the child chain code is $I_r$. Note also that "n" in "mod n" refers to the modulus parameter from the secp256k1 EC.

Also, in such an example embodiment, deriving a public child key from a public parent key includes determining whether the key is a hardened key (that is, whether i$\geq 2^{31}$). If the key is a hardened key, a failure indication is returned (as the result is invalid). If the key is a normal key, I=HMAC_SHA512 (the key=a chain code of parent key; data=serp(parent secret key)||ser32(i)). The first 32 bytes of I are $I_l$ and the second 32 bytes are $I_r$. The secret child key=point(parse256($I_l$))+parent secret key, and the child chain code is $I_r$, wherein+represents an EC group operation.

Further, such an example embodiment can include determining and/or distinguishing a public child key from a private parent key. By way of illustration, assume that there is a function N that computes the extended public key from an extended private key (using elliptic key cryptography secp256k1, for example): N(xPriv)→xPub. As such, to generate a public child key, the result of the above function above "Deriving a private child key from a private parent key=getChildPriv(X)" would be passed to N to generate the child public key, and the child public key=N(getChildPriv (Parent Private key)).

In accordance with one or more embodiments of the invention, keys can be generated in any tree-like structure as required in order to mimic or mirror a given hierarchy of roles or permissions that are required to be mapped for a given implementation. Moreover, in the system that is to be protected, a hierarchy of permissions is established. This can be carried out, for example, by creating a hierarchy of "roles" in the system, wherein each role is given a set of permissions and also granted one or more additional roles. An example of this is shown in FIG. 2, wherein each noted role (202, 204 and 206) also includes a set of permissions corresponding thereto. Once each key pair is generated, the pair can be used to generate request tokens to be sent between two systems (or devices, users, etc.).

Additionally, because public keys can be generated from a parent public key, a system wherein the private keys are held does not need to send a key representing a higher level of permission than the other system requires. By way of illustration, continuing with the above example, if users of System A should not have more than the permissions associated with the role of Ops (204), then System B would only need to share the Ops-related public key with System A, and at no point could any user on System A be able to generate a token with the permissions associated with the role of Admin (202). Also, in such an example embodiment, System A can generate the read-only (206) access tokens from the Ops (204) key without having to explicitly receive the read-only key (only the child key index). In at least one embodiment of the invention, the index level is specified for every request such that, for example, System B will know which key to verify against. Additionally, System A would understand the hierarchy of indexes that mapped to specific roles so as to generate keys for different levels of permissions below the key that was shared with a given role.

Figure 3:
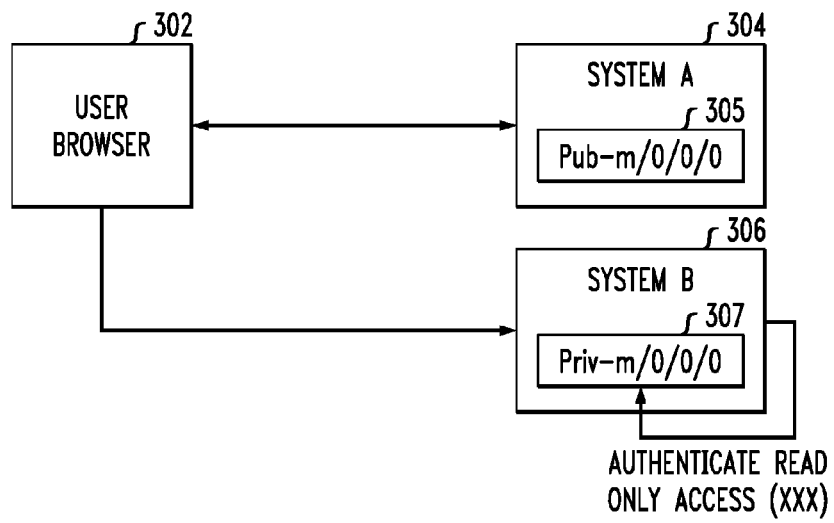
FIG. 3 is a diagram illustrating an authentication exchange mechanism, according to an example embodiment of the invention.

FIG. 3 is a diagram illustrating an authentication exchange mechanism, according to an example embodiment of the invention. Specifically, FIG. 3 depicts a mechanism by which two disparate systems (System A 304 and System B 306) can authenticate access between them using one-time login tokens, wherein such tokens can be validated based on deterministic hierarchical keys mapping to authorization levels, and only the minimum amount of data needs to be shared between the two systems.

As illustrated in FIG. 3, a user browser 302 corresponding to a user that is on System A 304 is attempting to authenticate to System B 306. As also depicted in FIG. 3, System B maintains a private key 307 that is mapped to a particular authorization level (m/0/0/0, associated with read-only access in the given example embodiment of the invention). Further, System A maintains a public key 305 that has been generated based on the above-noted private key of System B, and associated with the same particular authorization level (m/0/0/0). In one or more embodiments of the invention, a third party system can be responsible for generating and sharing keys, or System B, in the above example, can be responsible for generating and sharing keys. In this example, System A would not be responsible for generating and sharing keys because it would not be desirable for System A to have access to the private keys (and thereby gaining access to all levels of authorization on System B).

In the depicted authentication attempt, user browser 302 transmits a request indication to System A 304. By way of example, this request indication transmission can include a user (on System A) clicking on a link via user browser 302 that indicates a desire to access a resource on System B 306 (such as specific data on System B). By way of more specific example (and in connection with the depicted example of FIG. 3), such a request indication can include a transmission to System A 304 including, for example, "RequestSystem-bReadOnlyUrl," which describes the desired target at which the user seeks authentication (System B), the authorization level associated with this specific user (read-only (m/0/0/0)), and the nonce value (time-stamp) associated with this authentication request. Accordingly, the user would make a request to System A for a resource, while System A would recognize that the resource is on System B and provide the mechanism back to the user for retrieving the resource from System B.

Additionally, based on the information provided by System A 304 (generated utilizing System A's public key 305 (Pub-m/0/0/0), the user browser 302 transmits an authentication request in combination with the noted information provided by System A to System B 306. In an example embodiment of the invention, the entire transmission to System B would not need to be encrypted, but a portion thereof (such as the "XXX" value described below, which can be the payload encrypted with the public key) would be encrypted. By way of example (and in connection with the depicted example of FIG. 3), such a transmission can include "GET http://url?token=XXX," which describes the desired target at which the user seeks authentication (http://url?), and the login token associated with this particular user request (token=XXX), which would include an identification of the authorization level associated with this specific user (read-only (m/0/0/0) and the nonce value (time-stamp) associated with this authentication request (as generated via System A's public key 305).

System B 306 subsequently processes the transmission provided by user browser 302 to validate the authentication request. In an example embodiment of the invention, System B would decrypt and validate a portion of the request transmission (such as the "XXX" value described above, which can be the payload encrypted with the public key). Validating the authentication request includes comparing the included nonce value to the nonce values previously observed by System B to determine whether the included nonce value is greater than the previously received nonce values (for example, that the time-stamp represents a later point in time than the previously received time-stamp values). Additionally, validating the authentication request includes comparing the denoted authorization level associated with the requesting user (associated with public key 305 of System A 304) with the authorization level associated with the private key 307 of System B 306. If (i) the included nonce value is greater than the previously received nonce values and (ii) the denoted authorization level associated with the requesting user matches the authorization level associated with private key 307, then System B authenticates the user to access the desired resource within the limits associated with the noted authorization level "AuthenticateReadOnlyAccess(XXX)", as noted in the FIG. 3 example. If one or both of the above-noted aspects of the validation process are not successfully completed, then System B can deny the authentication request.

Figure 4:
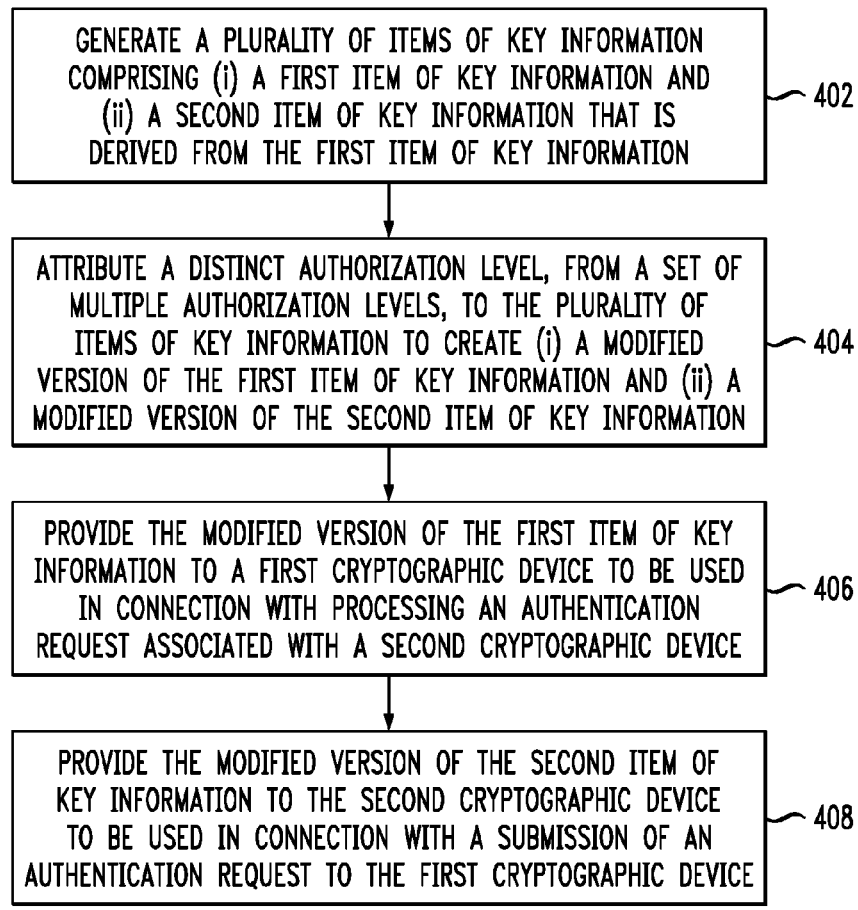
FIG. 4 is a flow diagram illustrating techniques according to an example embodiment of the invention.

FIG. 4 is a flow diagram illustrating techniques according to an embodiment of the present invention. Step 402 includes generating a plurality of items of key information comprising (i) a first item of key information and (ii) a second item of key information that is derived from the first item of key information. The first item of key information can include a private key, and the second item of key information can include a public key derived from the private key.

Step 404 includes attributing a distinct authorization level, from a set of multiple authorization levels, to the plurality of items of key information to create (i) a modified version of the first item of key information and (ii) a modified version of the second item of key information. In at least one embodiment of the invention, the set of multiple authorization levels is arranged in a hierarchy. Additionally, the set of multiple authorization levels can include a set of multiple pre-specified authorization levels within an enterprise, wherein each respective one of the multiple pre-specified authorization levels corresponds to one or more individuals within the enterprise.

Step 406 includes providing the modified version of the first item of key information to a first cryptographic device to be used in connection with processing an authentication request associated with a second cryptographic device.

Step 408 includes providing the modified version of the second item of key information to the second cryptographic device to be used in connection with a submission of an authentication request to the first cryptographic device. Providing the modified version of the second item of key information to the second cryptographic device can include providing the modified version of the second item of key information to the second cryptographic device to be used in connection with a submission of an authentication request, to the first cryptographic device, pertaining to a user having an authorization level that matches the distinct authorization level in the modified version of the second item of key information.

At least one embodiment of the invention can also include providing an incremental item of cryptographic information to the second cryptographic device to be used in connection with submission of an authentication request to the first cryptographic device. The incremental item of cryptographic information can include a time-stamp and/or a count value.

Figure 5:
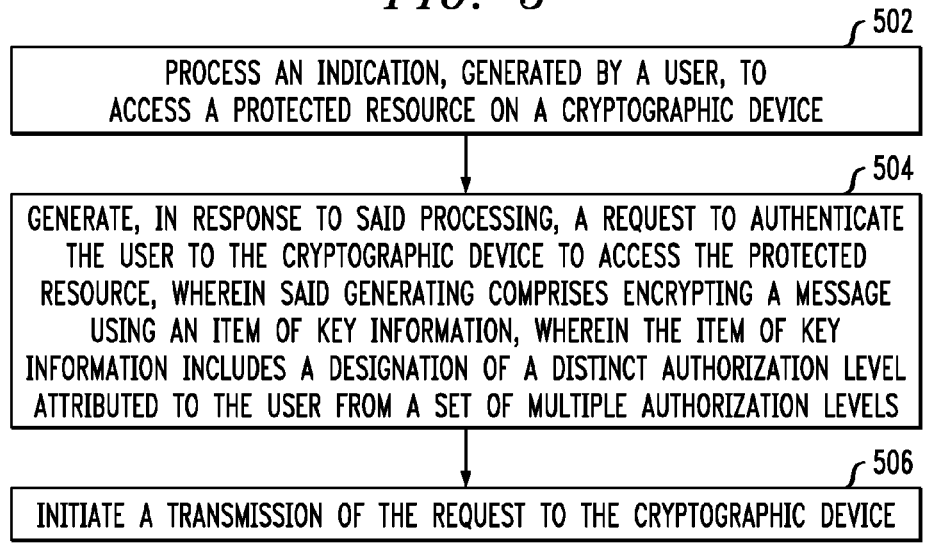
FIG. 5 is a flow diagram illustrating techniques according to an example embodiment of the invention.

FIG. 5 is a flow diagram illustrating techniques according to an example embodiment of the invention. Step 502 includes processing an indication, generated by a user, to access a protected resource on a cryptographic device. Step 504 includes generating, in response to said processing, a request to authenticate the user to the cryptographic device to access the protected resource, wherein said generating comprises encrypting a message using an item of key information, wherein the item of key information includes a designation of a distinct authorization level attributed to the user from a set of multiple authorization levels. The item of key information can include a public key derived from a private key associated with the cryptographic device. The message includes an incremental item of cryptographic information to be used exclusively in connection with the request to authenticate the user to the cryptographic device to access the protected resource. Step 506 includes initiating a transmission of the request to the cryptographic device. In at least one embodiment of the invention, initiating the transmission can include providing (via System A, as noted in above examples) information necessary to permit a given user and/or web browser to interact directly with a particular system (for example, System B). Additionally, by obtaining the encrypted payload with an authorization level, System B can then map that authorization level to a "role" on System B and verify the authorization level against the requested resource on System B.

Figure 6:
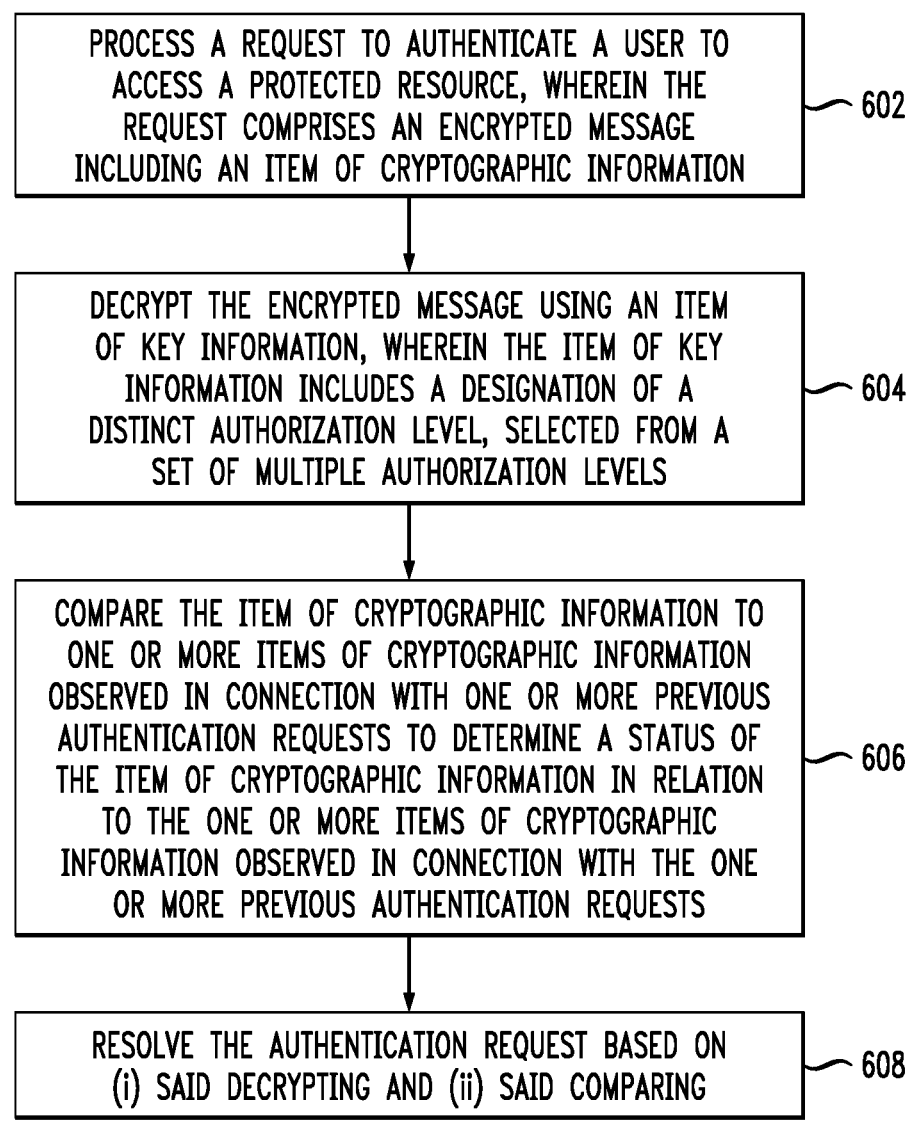
FIG. 6 is a flow diagram illustrating techniques according to an example embodiment of the invention.

FIG. 6 is a flow diagram illustrating techniques according to an example embodiment of the invention. Step 602 includes processing a request to authenticate a user to access a protected resource, wherein the request comprises an encrypted message including an item of cryptographic information. Step 602 includes step 604 and 606.

Step 604 includes decrypting the encrypted message using an item of key information, wherein the item of key information includes a designation of a distinct authorization level, selected from a set of multiple authorization levels. The item of key information can include a private key.

Step 606 includes comparing the item of cryptographic information to one or more items of cryptographic information observed in connection with one or more previous authentication requests to determine a status of the item of cryptographic information in relation to the one or more items of cryptographic information observed in connection with the one or more previous authentication requests.

Step 608 includes resolving the authentication request based on (i) said decrypting and (ii) said comparing. Resolving the authentication request can include granting access to the protected resource to the user in accordance with the distinct authorization level if: the encrypted message is successfully decrypted using the item of key information, and the item of cryptographic information satisfies the status determination of the item of cryptographic information in relation to the one or more items of cryptographic information observed in connection with the one or more previous authentication requests. Additionally, resolving the authentication request can include denying access to the protected resource to the user if: the encrypted message is not successfully decrypted using the item of key information, and/or the item of cryptographic information does not satisfy the status determination of the item of cryptographic information in relation to the one or more items of cryptographic information observed in connection with the one or more previous authentication requests.

Figure 7:
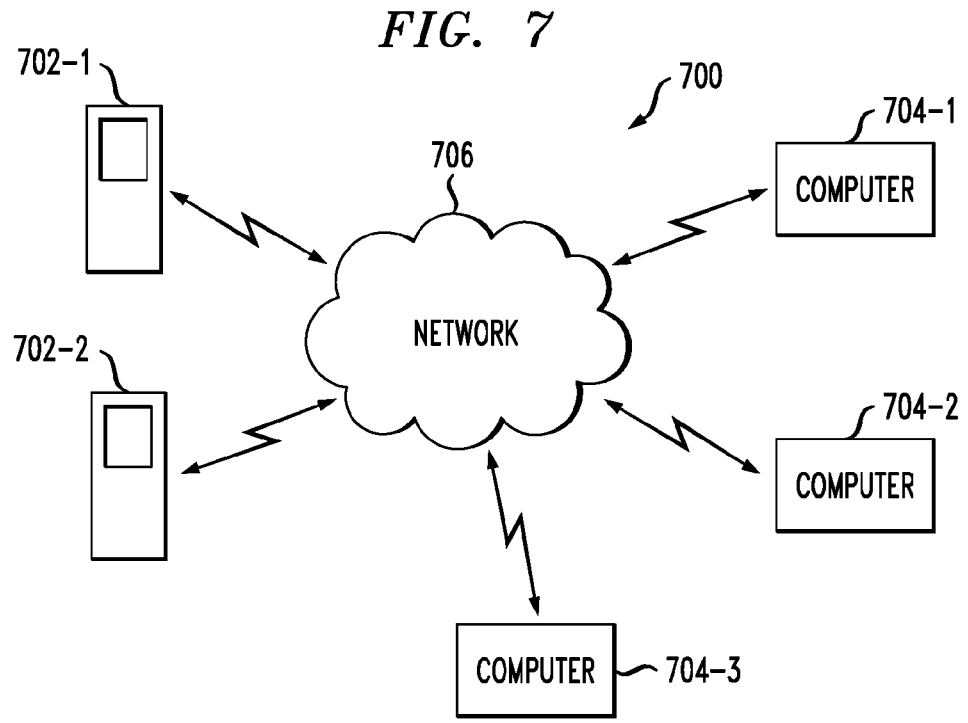
FIG. 7 is a diagram illustrating an example embodiment of communication systems that may incorporate functionality according to one or more embodiments of the invention.

FIG. 7 is a diagram illustrating an example embodiment of communication systems that may incorporate functionality according to one or more embodiments of the invention. As described herein, authentication techniques of the type associated with one or more embodiments of the invention may be implemented in a wide variety of different applications. By way merely of illustration, one exemplary communication system application that may incorporate such techniques will now be described with reference to FIG. 7.

As depicted in FIG. 7, a communication system 700 comprises a plurality of mobile devices 702-1 and 702-2 and computers 704-1, 704-2 and 704-3, configured to communicate with one another over a network 706. Any two or more of the devices 702 and 704 may correspond to cryptographic devices (such as devices 110-1 and/or 110-N as depicted in FIG. 1) configured to implement at least one embodiment of the invention, as described herein. It is also to be appreciated, however, that the techniques disclosed herein can be implemented in numerous other applications. For example, while FIG. 7 depicts network 706 as a wireless network, it is to be appreciated that one or more embodiments of the invention can be implemented in connection with a wired network.

Further, aspects of the present invention are described herein with reference to flowchart illustrations and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, other programmable cryptographic devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a cryptographic device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 8:
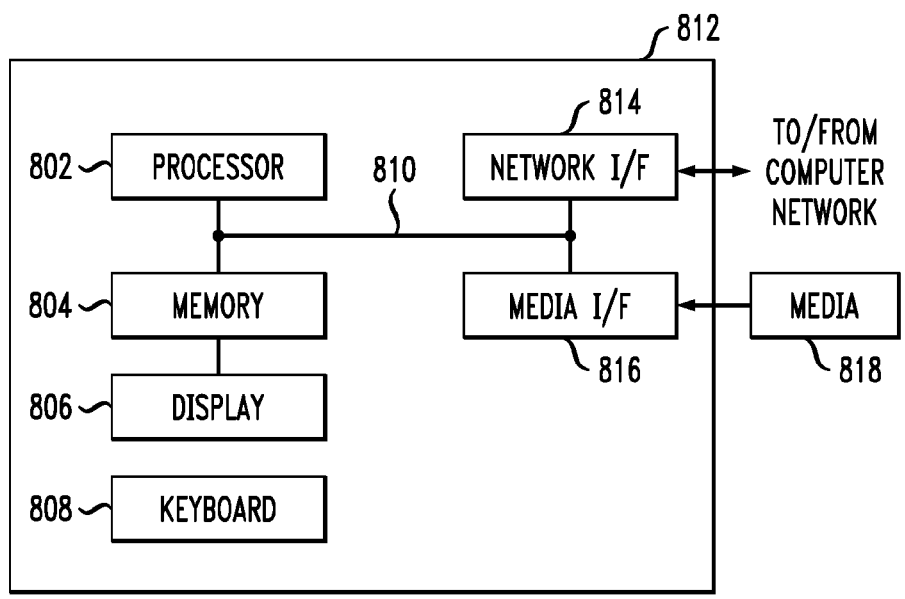
FIG. 8 is a system diagram of an exemplary cryptographic device on which at least one embodiment of the invention can be implemented.

FIG. 8 is a system diagram of an exemplary cryptographic device (such as device 110-1 and/or device 110-N in FIG. 1, for example) on which at least one embodiment of the invention can be implemented. As depicted in FIG. 8, an example implementation employs, for example, a processor 802, a memory 804, and an input/output interface formed, for example, by a display 806 and a keyboard 808. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 802, memory 804, and input/output interface such as display 806 and keyboard 808 can be interconnected, for example, via bus 810 as part of a data processing unit 812. Suitable interconnections via bus 810, can also be provided to a network interface 814 (such as a network card), which can be provided to interface with a computer network, and to a media interface 816 (such as a diskette or compact disc read-only memory (CD-ROM) drive), which can be provided to interface with media 818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 808, displays 806, and pointing devices, can be coupled to the system either directly (such as via bus 810) or through intervening I/O controllers.

Network adapters such as network interface 814 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 812 as depicted in FIG. 8) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from authentication techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
generating a plurality of items of key information comprising (i) a first item of key information and (ii) a second item of key information that is derived from the first item of key information, wherein said generating comprises (a) creating a randomly-generated seed attributed to a particular cryptographic device, and (b) generating multiple sub-keys derived from the randomly-generated seed, wherein each generated sub-key corresponds to a separate additional cryptographic device, and wherein both the first item of key information and the second item of key information correspond to a distinct one of the generated sub-keys;
attributing a distinct authorization level, from a set of multiple authorization levels, to the plurality of items of key information to create (i) a modified version of the first item of key information and (ii) a modified version of the second item of key information;
providing the modified version of the first item of key information to a first cryptographic device to be used in connection with processing an authentication request associated with a second cryptographic device; and
providing the modified version of the second item of key information to the second cryptographic device to be used, in conjunction with a distinct nonce value, in connection with a submission of an authentication request to the first cryptographic device, wherein the authentication request identifies (i) the cryptographic device at which authentication is sought, (ii) the distinct authorization level associated with the modified version of the second item of key information, and (iii) the distinct nonce value, which is associated specifically with the authentication request.

2. The method of claim 1, wherein the first item of key information comprises a private key.

3. The method of claim 2, wherein the second item of key information comprises a public key derived from the private key.

4. The method of claim 1, wherein the set of multiple authorization levels is arranged in a hierarchy.

5. The method of claim 1, wherein the set of multiple authorization levels comprises a set of multiple pre-specified authorization levels within an enterprise, wherein each respective one of the multiple pre-specified authorization levels corresponds to one or more individuals within the enterprise.

6. The method of claim 1, wherein said providing the modified version of the second item of key information to the second cryptographic device to be used in connection with a submission of an authentication request to the first cryptographic device comprises providing the modified version of the second item of key information to the second cryptographic device to be used in connection with a submission of an authentication request, to the first cryptographic device, pertaining to a user having an authorization level that matches the distinct authorization level in the modified version of the second item of key information.

7. The method of claim 1, wherein the distinct nonce value comprises the current time.

8. The method of claim 1, wherein the distinct nonce value comprises the current time in milliseconds.

9. An article of manufacture comprising a non-transitory processor-readable storage medium having processor-readable instructions tangibly embodied thereon which, when implemented, cause a processor to carry out steps comprising:

generating a plurality of items of key information comprising (i) a first item of key information and (ii) a second item of key information that is derived from the first item of key information, wherein said generating comprises (a) creating a randomly-generated seed attributed to a particular cryptographic device, and (b) generating multiple sub-keys derived from the randomly-generated seed, wherein each generated sub-key corresponds to a separate additional cryptographic device, and wherein both the first item of key information and the second item of key information correspond to a distinct one of the generated sub-keys;

attributing a distinct authorization level, from a set of multiple authorization levels, to the plurality of items of key information to create (i) a modified version of the first item of key information and (ii) a modified version of the second item of key information;

providing the modified version of the first item of key information to a first cryptographic device to be used in connection with processing an authentication request associated with a second cryptographic device; and providing the modified version of the second item of key information to the second cryptographic device to be used, in conjunction with a distinct nonce value, in connection with a submission of an authentication request to the first cryptographic device, wherein the authentication request identifies (i) the cryptographic device at which authentication is sought, (ii) the distinct authorization level associated with the modified version of the second item of key information, and (iii) the distinct nonce value, which is associated specifically with the authentication request.

10. The article of manufacture of claim 9, wherein the distinct nonce value comprises the current time.

11. The article of manufacture of claim 9, wherein the distinct nonce value comprises the current time in milliseconds.

12. The article of manufacture of claim 9, wherein the first item of key information comprises a private key.

13. A cryptographic device comprising:
a memory; and
a processor coupled to the memory and configured to:
generate a plurality of items of key information comprising (i) a first item of key information and (ii) a second item of key information that is derived from the first item of key information, wherein said generating comprises (a) creating a randomly-generated seed attributed to a particular cryptographic device, and (b) generating multiple sub-keys derived from the randomly-generated seed, wherein each generated sub-key corresponds to a separate additional cryptographic device, and wherein both the first item of key information and the second item of key information correspond to a distinct one of the generated sub-keys;

attribute a distinct authorization level, from a set of multiple authorization levels, to the plurality of items of key information to create (i) a modified version of the first item of key information and (ii) a modified version of the second item of key information;

provide the modified version of the first item of key information to a first cryptographic device to be used in connection with processing an authentication request associated with a second cryptographic device; and provide the modified version of the second item of key information to the second cryptographic device to be used, in conjunction with a distinct nonce value, in connection with a submission of an authentication request to the first cryptographic device, wherein the authentication request identifies (i) the cryptographic device at which authentication is sought, (ii) the distinct authorization level associated with the modified version of the second item of key information, and (iii) the distinct nonce value, which is associated specifically with the authentication request.

14. The device of claim 13, wherein the set of multiple authorization levels is arranged in a hierarchy.

15. The device of claim 13, wherein the set of multiple authorization levels comprises a set of multiple pre-specified authorization levels within an enterprise, wherein each respective one of the multiple pre-specified authorization levels corresponds to one or more individuals within the enterprise.

16. The article of manufacture of claim 12, wherein the second item of key information comprises a public key derived from the private key.

17. The device of claim 13, wherein the distinct nonce value comprises the current time.

18. The device of claim 13, wherein the distinct nonce value comprises the current time in milliseconds.

19. The device of claim 13, wherein the first item of key information comprises a private key.

20. The device of claim 19, wherein the second item of key information comprises a public key derived from the private key.

* * * * *